W. G. PRICE.
BRAKE HANGER.
APPLICATION FILED NOV. 25, 1911.

1,067,842.

Patented July 22, 1913.

2 SHEETS—SHEET 1.

WITNESSES.
J. R. Keller
Robt. C. Totten

INVENTOR.
William Gunn Price
By Kay & Totten
attorneys

W. G. PRICE.
BRAKE HANGER.
APPLICATION FILED NOV. 25, 1911.
1,067,842.
Patented July 22, 1913.
2 SHEETS—SHEET 2.
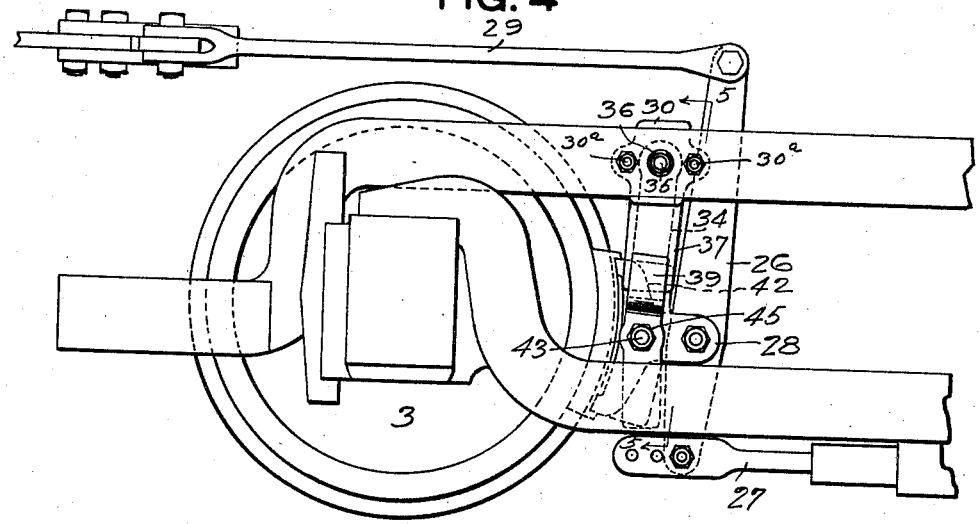
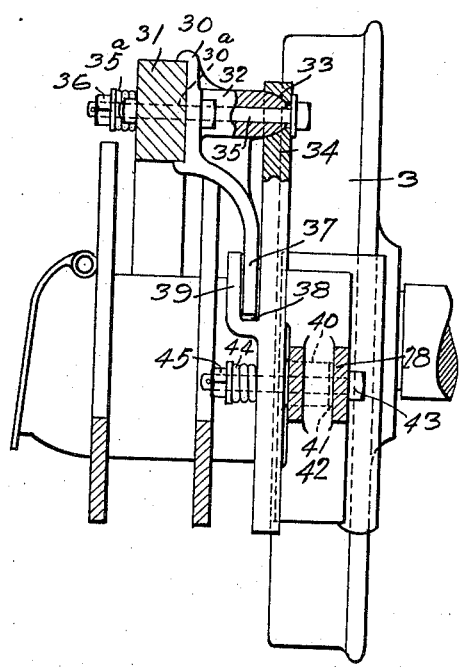
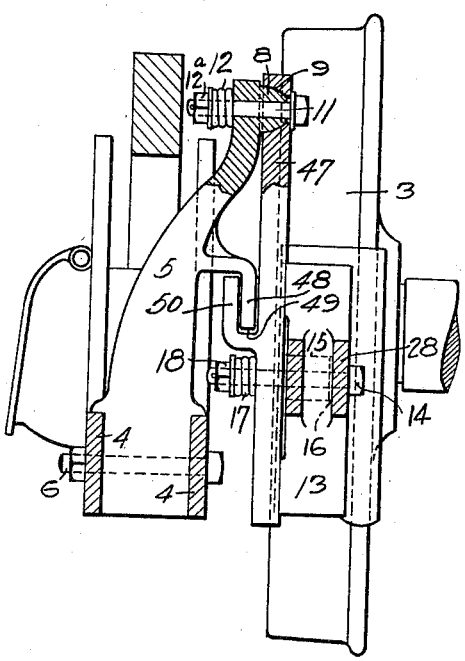

UNITED STATES PATENT OFFICE.

WILLIAM GUNN PRICE, OF NEW CASTLE, PENNSYLVANIA.

BRAKE-HANGER.

1,067,842.

Specification of Letters Patent.  Patented July 22, 1913.

Application filed November 25, 1911.  Serial No. 662,458.

*To all whom it may concern:*

Be it known that I, WILLIAM GUNN PRICE, a citizen of the United States, and resident of New Castle, in the county of Lawrence and State of Pennsylvania, have invented a new and useful Improvement in Brake-Hangers; and I do hereby declare the following to be a full, clear, and exact description thereof.

My invention relates to brake hangers. The object of my invention is to provide a brake rigging in which the hanger supporting the brake-shoe is held against undue lateral movement whereby the brake-shoe is always held in proper relation to the wheel where the brakes are released or applied, while at the same time the wear on the connecting parts is reduced to a minimum.

To these ends my invention comprises, generally stated, a suitable bracket or support, a brake-hanger suspended therefrom, a brake-shoe head secured to said brake-hanger, and means for preventing lateral movement of the brake-hanger, whereby the brake-shoe is held in proper alinement with reference to the tread of the wheel.

Figure 1:
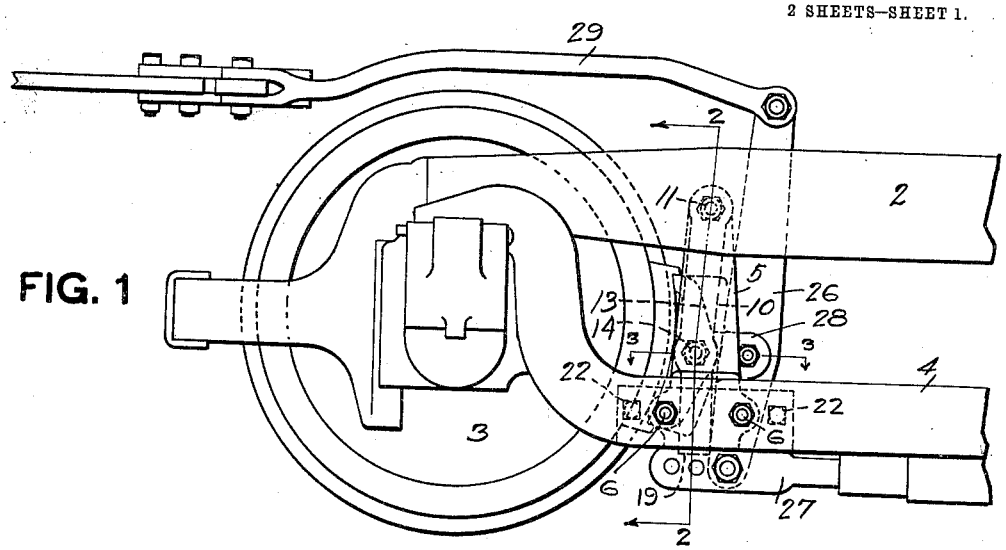
Figure 2:
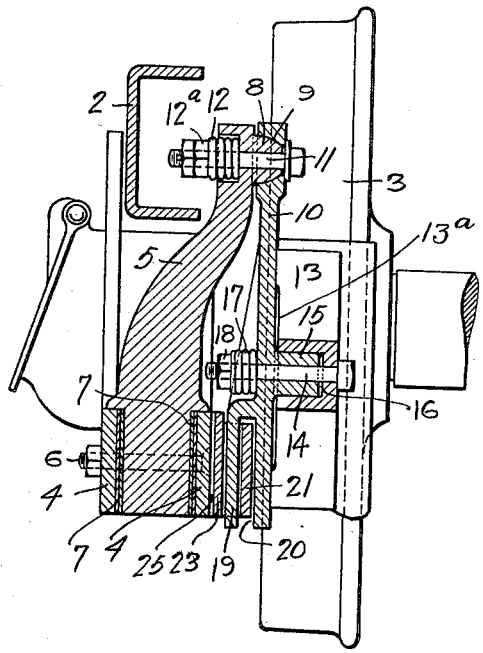
Figure 3:
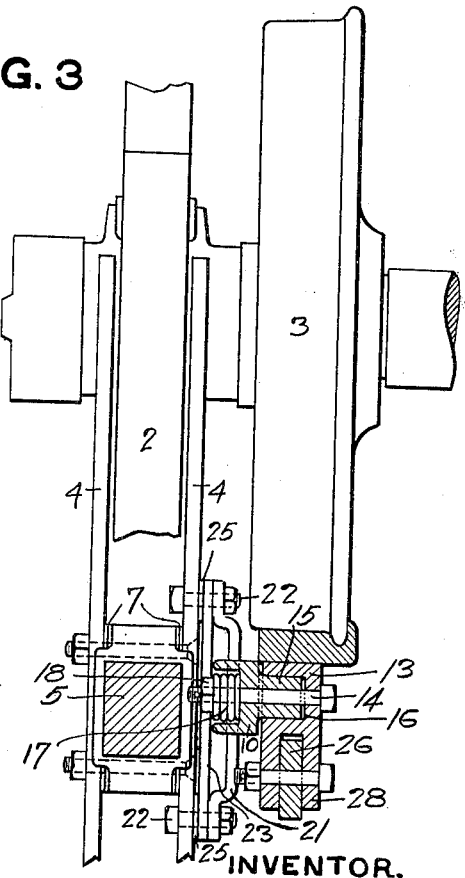

In the accompanying drawings Figure 1 is a side elevation of a portion of a truck showing my invention applied thereto. Fig. 2 is a section on the line 2—2 Fig. 1. Fig. 3 is a section on the line 3—3 Fig. 1; and Figs. 4, 5 and 6 show modified forms of my invention.

In the drawings the numeral 2 designates a suitable truck frame supported on the wheels 3, the springs, journal box, etc., being of any suitable construction. The truck frame is further provided with the equalizer bars 4 which extend from one journal box to the other. The bracket 5 is supported by the equalizer bars 4 and said bracket is secured to said equalizer bars by the bolts 6. The shims 7 may be inserted between the bracket 5 and the inner faces of the equalizer bars 4 for adjusting the bracket to and from the wheel, as may be found necessary to get the proper adjustment. The upper end of the bracket has the projection 8 which may be conical in form and said projection enters a corresponding recess 9 in the upper end of the hanger 10. A bolt 11 passes through the upper end of the bracket 5 and said bolt secures the hanger to said bracket. A strong spring 12 surrounds the bolt 11 and said spring is compressed between the bracket 5 and the nut $12^a$ on said bolt so as to give a frictional pivot to resist the swinging movement of the hanger 10 whereby the shoe is held up in proper relation to the wheel, all as contained and set forth in a patent previously granted to me No. 818,639.

The brake-shoe head 13 is secured to the lower end of the hanger 10 by the bolt 14. The brake hanger has the cylindrical projection 15 which enters a recess 16 in the brake-shoe head 13. The spring 17 is interposed between the hanger 10 and the nut 18. This spring acts to hold the brake-shoe up in proper relation to the wheel and prevents the sagging or tilting of the shoe and the uneven wear consequent thereto. Further the spring 17 and bolt 14 will be amply able to prevent the separation of the top of the brake-head from the hanger by the downward pull on the head caused by the wheel during a brake application. In this manner a single hanger 10 may be employed which is pivoted at its upper end to the bracket or support 5 and is connected at its lower portion to one side of the brake-shoe head.

The main object of my invention is to support the hanger 10 against lateral movement so as to hold the brake-shoe head in proper relation to the tread of the wheel where a single hanger is employed, and where no beam is used. This may be accomplished in a number of different ways all of which come under the broad scope of my invention, and I have illustrated several forms. In the first form the lower end of the hanger 10 extends below the connection with the brake-shoe head, and is bifurcated by the off-set 19 to form a recess 20. This recess 20 is engaged by the guide-plate 21 which is secured to the equalizer bars 4 by the bolts 22. A suitable wear plate 23 is also secured by the bolts 22 to relieve the equalizer bars of any wear.

Washers 25 are interposed between the wear plates 23 and the equalizer bars and said washers may act as spacing shims to adjust the lower end of the hanger or to take up any wear and prevent any undue movement of the hanger of the guide. In this manner the lower end of the hanger is free to swing horizontally the necessary amount to apply and release the brake-shoes as well as for the swinging back of the brake-hanger when it is desired to renew the shoes. The brake-hanger, however, is guided and held against lateral movement by the engagement of its bifurcated ends with the guide plate so that the lateral movement of the shoe is prevented and the shoe held in proper alinement with the wheel to give an even wearing to the same.

The brake shoe head is cut away as at 13ª, and its upper and lower ends bear against the inner face of the hanger 10, and as the hanger extends for the full length of said head, said head is supported along its outer face at the upper and lower ends, so as to hold said head in proper alinement and prevent its tilting laterally. I prefer to have the head cut away as at 13ª, so that the head will bear at its upper and lower end against the inner face of the hanger and give more even wear.

The live lever 26 is pivoted at its lower end to the adjusting bar 27 and is connected to the lug 28 of the brake-shoe head while the upper end of said lever is connected to the ordinary operating rod 29. By dispensing with the brake-beam and by using a single hanger located on the outside of the brake-head, so that there is no obstruction to the movement of the lever 26, the brake-lever 26 is arranged vertically instead of diagonally, as in the case where double brake-hangers are employed, and it is placed to one side so that said lever and the brake-hanger do not in any way interfere with the location of the motor.

In Figs. 4 and 5 I have illustrated a modified form of my invention in which a bracket 30 is secured by bolts 30ª to the side frame 31 of the truck, said bracket having the projection 32 which enters a conical seat 33 in the hanger 34, a bolt 35 passing through the hanger bracket and side frame secures the hanger to the bracket and a spring 35ª is interposed between the side frame and the nut 36. The bracket 30 has the downwardly extending arm 37 which is adapted to engage the recess 38 formed between the hanger 34 and the off-set 39 on said hanger. The lower end of the hanger 34 has the projection 40 which enters the recess 41 in the brake-shoe head 42. A bolt 43 connects the hanger with the brake-shoe head. A spring 44 in said bolt is interposed between said hanger and the nut 45. In this modified form of my invention the guiding means for holding the hanger against lateral movement is located above the connection of the hanger with the brake-shoe head and the guiding arm 37 on the bracket 30 prevents any undue lateral movement of the hanger. The hanger is in this instance supported by the truck frame and not carried directly by the equalizer bar as in the former instance, but by the bracket 30 connected to the side frame of the truck, and the guiding member forms part of the bracket.

In Fig. 6 I have illustrated another modified form of my invention in which the hanger 47 is carried as before by the bracket 5 supported by the equalizer bars 4. However, in this case the guiding member 48 is connected to the bracket 5, and said guiding member engages the seat 49 formed between the hanger 47 and the off-set 50.

What I claim is:

1. In brake rigging, the combination of a suitable support, a single brake hanger suspended therefrom, a brake-head, a projection on one side of said hanger entering a seat formed therefor in said brake-head, a bolt passing through said projection and head, and said head in contact with the adjacent face of said hanger.

2. In brake rigging, the combination of a suitable support, a single brake hanger suspended therefrom, a brake-head, a projection on one side of said hanger entering a seat formed therefor in said brake-head, a bolt passing through said projection and head, and said head in contact with the adjacent face of said hanger extending the full length of said head.

3. In brake rigging, the combination of a suitable support, a single brake hanger suspended therefrom, a brake-head, a projection on one side of said hanger entering a seat formed therefor in said brake-head, a bolt passing through said projection, a head, said head being cut away on its face adjoining said hanger and in contact with said hanger at its upper and lower ends.

4. In brake-rigging, the combination of a suitable support, a single brake-hanger suspended therefrom, a brake-head, said brake-hanger being connected to one side of said brake-head, and a guide in slidable engagement with said hanger to prevent lateral movement of same.

5. In brake-rigging, the combination of a suitable support, a brake-hanger suspended therefrom, a brake-head, said hanger being connected to one side of said brake-head, a guide, and said hanger having a recess to receive said guide in slidable engagement therewith.

6. In brake-rigging, the combination of a suitable support, a hanger suspended therefrom, a brake-shoe head, a hanger connected to one side of said head, a guide-member, and said hanger having a bifurcated portion to engage said guide-member.

7. In brake-rigging, the combination of a suitable support, a hanger suspended therefrom, a brake-shoe head, said hanger being connected to one side of said head, a guide engaged by said hanger, said hanger extending the entire length of said brake-head and engaging therewith.

8. The combination of a suitable support, a brake-hanger suspended therefrom, a brake-head carried by said hanger, and means engaged by the lower portion of said hanger to prevent the lateral movement of same.

9. The combination of a suitable support, a brake-hanger suspended therefrom, a brake-head carried by said hanger, and a guide engaged by the lower portion of said hanger to prevent lateral movement of same.

10. The combination of a suitable support, a hanger suspended therefrom, a brake-shoe head supported by said hanger, a guide-plate, and the lower portion of said hanger having a recess with which said guide-plate engages.

11. The combination of a suitable support, a hanger suspended therefrom, a brake-shoe head carried by said hanger, a guide-plate, and the lower portion of said hanger being bifurcated to engage said plate.

12. The combination of a suitable support, a hanger suspended therefrom, a brake-shoe head carried by said hanger, and a guide-plate secured to the equalizer-bar, the lower portion of said hanger engaging said guide-plate.

13. In a brake-rigging, the combination of a suitable support, a brake-hanger suspended therefrom, a brake-head, a guide, and said hanger having a recess to receive said guide in slidable engagement therewith.

14. In a brake-rigging the combination of a suitable support, a brake hanger suspended therefrom, a brake-head, a guide, said hanger engaging said guide below the point of suspension to prevent lateral movement of the hanger.

In testimony whereof, I the said WILLIAM GUNN PRICE have hereunto set my hand.

WILLIAM GUNN PRICE.

Witnesses:
ROBERT C. TOTTEN,
JOHN F. WILL.

---

Copies of this patent may be obtained for five cents each, by addressing the "Commissioner of Patents, Washington, D. C."